United States Patent
Al Ahmad et al.

(10) Patent No.: US 9,455,649 B2
(45) Date of Patent: Sep. 27, 2016

(54) APPARATUS AND METHOD FOR ENERGY HARVESTING

(71) Applicants: United Arab Emirates University, Al-Ain (AE); Masdar Institute, Al-Ain (AE)

(72) Inventors: Mahmoud F. Al Ahmad, Al-Ain (AE); Irfan Saadat, Al-Ain (AE)

(73) Assignees: UNITED ARAB EMIRATES UNIVERSITY, Al-Ain, Abu Dhabi (AE); MASDAR INSTITUTE, Al-Ain, Abu Dhabi (AE)

( * ) Notice: Subject to any disclaimer, the term of this patent is extended or adjusted under 35 U.S.C. 154(b) by 670 days.

(21) Appl. No.: 13/913,709

(22) Filed: Jun. 10, 2013

(65) Prior Publication Data

US 2014/0361662 A1 Dec. 11, 2014

(51) Int. Cl.
*H01L 41/113* (2006.01)
*H02N 2/18* (2006.01)
*H02N 11/00* (2006.01)

(52) U.S. Cl.
CPC .............. *H02N 2/181* (2013.01); *H02N 2/188* (2013.01); *H02N 11/008* (2013.01); *Y10S 74/09* (2013.01)

(58) Field of Classification Search
CPC ...................................................... F23Q 3/002
USPC ........................................................ 310/339
See application file for complete search history.

(56) References Cited

U.S. PATENT DOCUMENTS

| 7,471,033 | B2 | 12/2008 | Thiesen et al. |
| 2007/0096595 | A1* | 5/2007 | Larson ........................... 310/318 |
| 2007/0114890 | A1* | 5/2007 | Churchill et al. ............. 310/339 |
| 2009/0146534 | A1 | 6/2009 | Reichmann et al. |
| 2011/0285131 | A1* | 11/2011 | Kwon et al. ..................... 290/50 |
| 2014/0021828 | A1* | 1/2014 | Despesse ....................... 310/319 |
| 2014/0334193 | A1* | 11/2014 | Meyer et al. .............. 363/21.01 |

OTHER PUBLICATIONS

Niel G. Elvin et al., "A self-powered mechanical strain energy sensor", Institute of Physics Publishing, Smart Mater. Struct., vol. 10 No. 2, Apr. 2001, pp. 293-299.

N. Elvin et al., "A self-powered damage detection sensor", J. Strain Analysis vol. 38 No. 2, Jan. 2003, pp. 115-124.

Jonathan Granstrom et al., "Energy harvesting from a backpack instrumented with piezoelectric shoulder straps", IOP Publishing, Smart Mater. Struct. 16, Sep. 2007, pp. 1810-1820.

E. Hausler et al., "Implantable Physiological Power Supply With PVDF Film" Ferroelectrics, 1984, vol. 60:1, pp. 277-282.

(Continued)

*Primary Examiner* — Thomas Dougherty
(74) *Attorney, Agent, or Firm* — Katten Muchin Rosenman LLP

(57) ABSTRACT

An apparatus for energy conversion, comprising a piezoelectric component comprising a first part configured to convert vibrational energy into electrical energy; and an output for sending a first portion of the generated electrical energy to an electronic device, and a feedback loop for feeding a second portion of the generated electrical energy to a second part of the piezoelectric component, wherein the second part of the piezoelectric component is coupled to the first part of the piezoelectric component and is configured to convert electrical energy into vibrational energy thereby causing the first part of the piezoelectric component to vibrate.

14 Claims, 5 Drawing Sheets

(56) References Cited

OTHER PUBLICATIONS

John Kymissis et al., "Parasitic Power Harvesting in Shoes" (Physics and Media Group, MIT Media Laboratory E15-410, Cambridge, MA. 02139 USA) presented at the Second IEEE International Conference on Wearable Computing,Dec. 19-20, 1998: IEEE Computer Society Press.

Mahmoud Al Ahmad and H.N. Alshareef, "Modeling the Power Output of Piezoelectric Energy Harvesters", Journal of Electronic Materials, vol. 40, No. 7, Apr. 30, 2011, pp. 1477-1484.

Penglin Niu et al., "Evaluation of Motions and Actuation Methods for Biomechanical Energy Harvesting", 35th Annual IEEE Power Electronics Specialists Conference, Jun. 20-25, 2004, Aachen, Germany, pp. 2100-2106.

Piazza Gianluca, "One and Two Port Piezoelectric Higher Order Contour-Mode MEMS Resonators for Mechanical Signal Processing", Solid State Electronics, vol. 51, Issues 11-12, Dec. 2007, pp. 1596-1608.

Shashank Priya, "Modeling of electric energy harvesting using piezoelectric windmill", Applied Physics Letters 87, Oct. 24, 2005, pp. 184101.

Shadrach Joseph Roundy, "Energy Scavenging for Wireless Sensor Nodes with a Focus on Vibration to Electricity Conversion", Spring 2003, PhD dissertation, University of California.

Shad Roundy et al., "A study of low level vibrations as a power source for wireless sensor nodes", Computer Communications, vol. 26, Issue 11, Jul. 1, 2003, pp. 1131-1144.

Shad Roundy, "On the Effectiveness of Vibration-based Energy Harvesting", Journal of Intelligent Material Systems and Structures, Sep. 29, 2005, vol. 16, pp. 809-823.

Henry A. Sodano et al., "A Review of Power Harvesting from Vibration using Piezoelectric Materials", The Shock and Vibration Digest, vol. 36, No. 3, May 2004, pp. 97-205.

Henry A. Sodano et al., "Generation and Storage of Electricity from Power Harvesting Devices", Journal of Intelligent Material Systems and Structures, vol. 16, Jan. 2005, pp. 67-75.

Henry A. Sodano et al., "Comparison of Piezoelectric Energy Harvesting Devices for Recharging Batteries", Journal of Intelligent Material Systems and Structures, vol. 16, Oct. 2005, pp. 799-807.

Henry A. Sodano et al., "An experimental comparison between several active composite actuators for power generation", Institute of Physics Publishing, Smart Mater. Struct. 15, Aug. 9, 2006, pp. 1211-1216.

T. Sterken et al., "Comparative Modelling for Vibration Scavengers", Sensors 2004, proceedings of IEEE, Oct. 24-27, 2004, vol. 3, pp. 1249-1252.

George W. Taylor et al., "The Energy Harvesting Eel: A Small Subsurface Ocean/River Power Generator", IEEE Journal of Oceanic Engineering, vol. 26, No. 4, Oct. 2001, pp. 539-547.

R.J.M. Vullers et al., "Micropower energy harvesting", Solid-State Electronics, vol. 53, Apr. 25, 2009, pp. 684-693.

C. B. Williams et al., "Analysis of a Micro-Electric Generator for Microsystems", Transducers '95 Eurosensors IX, The 8th International Conference on Solid-state Sensors and Actuators, and Eurosensors IX, Stockholm, Sweden, Jun. 25-29, 1995, pp. 369-372.

International Search Report for International Application No. PCT/IB2014/062077, with a mailing date of Sep. 24, 2014.

* cited by examiner

APPARATUS AND METHOD FOR ENERGY HARVESTING

FIELD OF THE INVENTION

This invention relates to apparatus, systems and methods for harvesting energy.

BACKGROUND OF THE INVENTION

Apparatus and systems for harvesting energy in the form of vibrations and converting these into electrical energy for the purpose of powering electronic devices are well known. Most of these take advantage of the piezoelectric effect and power harvesting using piezoelectric materials has been investigated for various different applications.

It has been shown to be possible to harvest energy from walking using piezoelectric materials embedded in shoes and also in a backpack strap which generates electrical energy from the oscillating tension in the strap during walking. Systems have also demonstrated that it's possible to harvest energy from air flow, water currents and environmental vibrations, amongst other things, using piezoelectric materials.

SUMMARY OF THE INVENTION

A first aspect of this invention provides an apparatus for energy conversion, comprising a piezoelectric component comprising a first part configured to convert vibrational energy into electrical energy; and an output for sending a first portion of the generated electrical energy to an electronic device, and a feedback loop for feeding a second portion of the generated electrical energy to a second part of the piezoelectric component, wherein the second part of the piezoelectric component is coupled to the first part of the piezoelectric component and is configured to convert electrical energy into vibrational energy thereby causing the first part of the piezoelectric component to vibrate.

In an embodiment of the invention, the first part of the piezoelectric component is configured to provide a AC voltage and the apparatus further comprises an AC-DC converter configured to convert the generated AC voltage to a DC voltage, and to feed a first portion of a generated current to the output and a second portion of the generated current to the feedback loop, this is done through a built-in splitter circuitry.

In a further embodiment of the invention, wherein the feedback loop further comprises an oscillator configured to receive the second portion of the generated current from the AC-DC converter, to generate an alternating voltage and to apply the generated alternating voltage to the second part of the piezoelectric component.

In a further embodiment of the invention, the generated current is a direct current and the second portion of the direct current is used by the oscillator. Alternatively or additionally, the DC voltage generated by the AC-DC converter is used by the oscillator and the electronic device connected to the output.

In a further embodiment of the invention, the oscillator is configured to generate an alternating voltage at an identical frequency to the effective resonant frequency of the piezoelectric component.

In a further embodiment of the invention, the oscillator is configured to send alternating current which oscillates in the same phase as the piezoelectric component oscillations.

In a further embodiment of the invention, wherein the surfaces of the first part of the piezoelectric component are interfaced by electrodes for collecting charges from the first part of the piezoelectric component and the surfaces of the second part of the piezoelectric component are interfaced by electrodes for imparting charges into the piezoelectric component.

In a further embodiment of the invention, the first part of the piezoelectric component is separated from the second part of the piezoelectric component by an insulating layer while maintaining intimate mechanical coupling.

Preferably the piezoelectric component is a multilayer piezoelectric cantilever.

Preferably the oscillator is a voltage controlled oscillator (VCO).

Preferably, the apparatus further comprises a frequency down converter for down-converting the frequency of an output of the oscillator so that the oscillator frequency can be tuned and caused to match the effective resonant frequency of the piezoelectric component.

Preferably, the apparatus further comprises an energy storage unit for temporarily storing at least a portion of the electrical energy generated by the piezoelectric component before providing the portion of the electrical energy to the electronic device.

In a further embodiment of the invention, there is provided a system comprising the apparatus as described in this statement of invention and an electronic device powered by the apparatus, wherein the electronic device is one of the following: a sensor, a transmitter, a receiver, a light, a speaker and an electric circuit.

A second aspect of this invention provides a method for energy conversion comprising: converting vibrational energy using a first part of a piezoelectric component into electrical energy, outputting a first portion of the generated electrical energy to an electronic device, feeding a second portion of the generated electrical energy towards a second part of the piezoelectric component via a feedback loop, and converting, by the second part of the piezoelectric component, electrical energy into vibrational energy thereby causing the first part of the piezoelectric component coupled to the second part of the piezoelectric component to vibrate.

In a further embodiment of the invention, the method further comprises converting an alternating voltage generated by the first part of the piezoelectric component by an AC-DC converter into a DC voltage, before diverting a first portion of a generated current to the output and a second portion of the generated current to the feedback loop.

In a further embodiment of the invention, the method further comprises using an oscillator to in the feedback loop to generate an alternating voltage.

In a further embodiment of the invention, the generated current is a direct current and the second portion of the direct current is used by the oscillator.

In a further embodiment of the invention, the method further comprises configuring the oscillator to generate an alternating voltage at an identical frequency to the effective resonant frequency of the piezoelectric component.

In a further embodiment of the invention, the method further comprises configuring the oscillator to generate an alternating voltage which oscillates in the same phase as the piezoelectric component oscillations.

In a further embodiment of the invention, the method further comprises collecting charges from the first part of the piezoelectric component on electrodes interfaced onto the surfaces of the piezoelectric component, and using electrodes to interface the surfaces of the second part of the piezoelectric component.

In a further embodiment of the invention, the method further comprises using an insulating layer to separate the first part of the piezoelectric component from the second part of the piezoelectric component.

In a further embodiment of the invention, the method further comprises powering an electronic device using the first portion of the generated electricity, wherein the electronic device is one of the following: a sensor, a transmitter, a receiver, a light, a speaker or an electric circuit.

A third aspect of this invention provides an apparatus for energy conversion comprising: means for converting mechanical energy of a first part of a component into electrical energy, means for outputting a first portion of the generated electrical energy to an electronic device, means for feeding a second portion of the generated electrical energy towards a second part of a component via a feedback loop, and means for converting, by the second part of the piezoelectric component, electrical energy into mechanical energy thereby causing the first part of the piezoelectric component coupled to the second part of the piezoelectric component to move and/or deform thereby obtaining additional mechanical energy.

A forth aspect of this invention provides an apparatus for energy conversion comprising: means for converting vibrational energy of a first part of a piezoelectric component into electrical energy, means for outputting a first portion of the generated electrical energy to an electronic device, means for feeding a second portion of the generated electrical energy towards a second part of the piezoelectric component via a feedback loop, and means for converting electrical energy into vibrational energy of the second part of the piezoelectric component, thereby causing the first part of the piezoelectric component coupled to the second part of the piezoelectric component to vibrate.

In a further embodiment of the invention, the apparatus further comprises means for converting an alternating voltage generated by the first part of the piezoelectric component by an AC-DC converter into a DC voltage, before diverting a first portion of a generated current to the output and a second portion of the generated current to the feedback loop.

In a further embodiment of the invention, the method further comprises using an oscillator to in the feedback loop to generate an alternating voltage.

In a further embodiment of the invention, the oscillator uses the second portion of the generated current.

In a further embodiment of the invention, the apparatus further comprises means for configuring the oscillator to generate an alternating voltage at an identical frequency to the effective resonant frequency of the piezoelectric component.

In a further embodiment of the invention, the apparatus further comprises means for configuring the oscillator to generate an alternating voltage which oscillates in the same phase as the piezoelectric component oscillations.

In a further embodiment of the invention, the apparatus further comprises means for collecting charges from the first part of the piezoelectric component on electrodes interfaced onto the surfaces of the piezoelectric component, and using electrodes to interface the surfaces of the second part of the piezoelectric component.

In a further embodiment of the invention, the apparatus further comprises means for insulating the first part of the piezoelectric component from the second part of the piezoelectric component.

In a further embodiment of the invention, the apparatus further comprises means for powering an electronic device using electricity generated by the apparatus, wherein the electronic device is one of the following: a sensor, a transmitter, a receiver, a light, a speaker or an electric circuit.

BRIEF DESCRIPTION OF THE DRAWINGS

Embodiments of the present invention will now be described by way of example with reference to the accompanying drawings.

DETAILED DESCRIPTION

Embodiments of this invention provide an apparatus and a method for converting vibrational energy into electrical energy for powering an electronic device. The apparatus comprises a piezoelectric component comprising a first part configured to convert vibrational energy into electrical energy thereby generating an electrical current and/or voltage. The apparatus also comprises an output for sending a first portion of the generated current to the electronic device, and a feedback loop for sending a second portion of the current to a second part of the piezoelectric component. The second part of the piezoelectric component is configured to convert electrical energy into vibrational energy thereby causing the first part of the piezoelectric component to vibrate.

Figure 1:
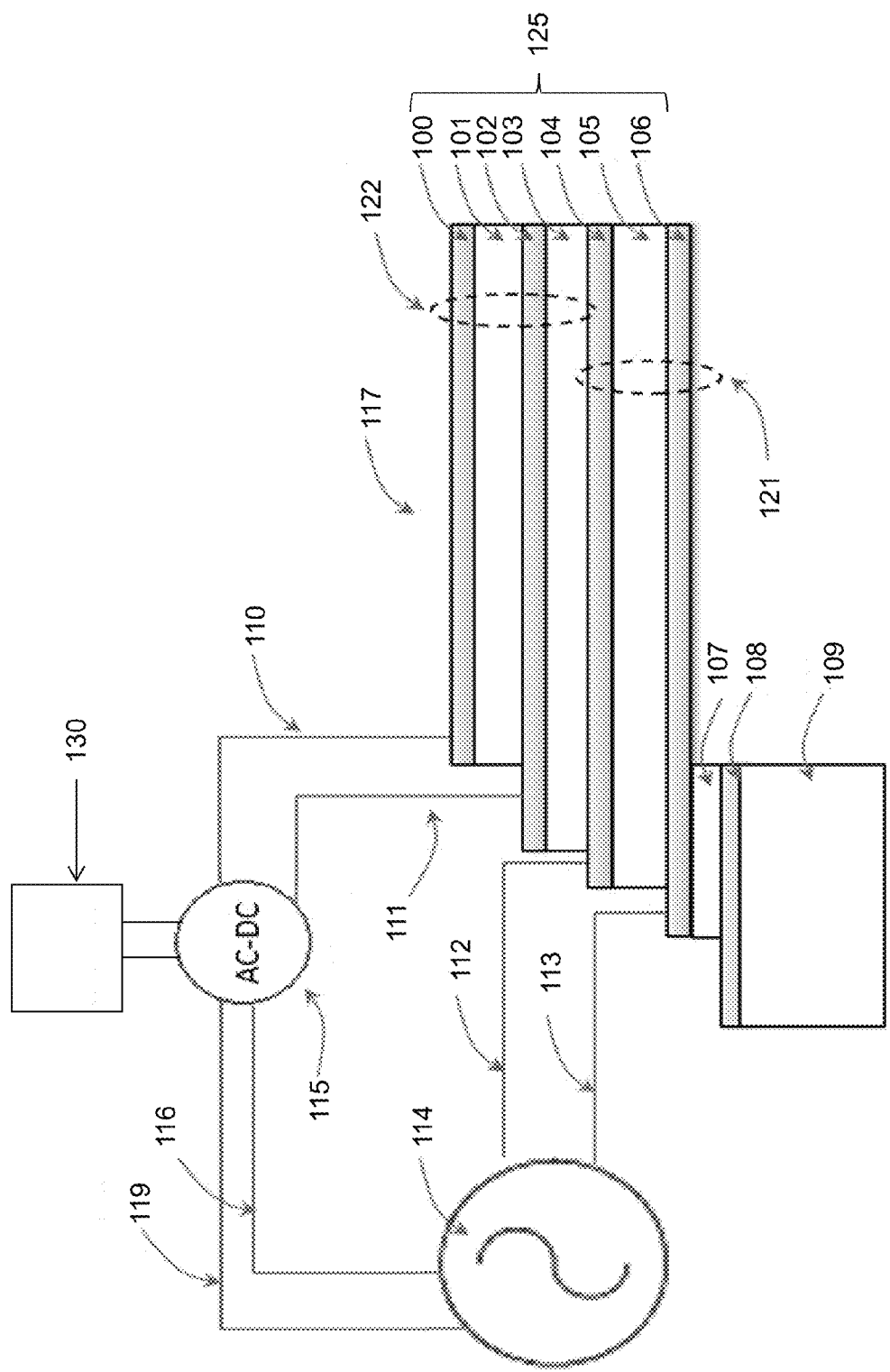
FIG. 1 shows a schematic view of a first embodiment of the invention.

FIG. 1 shows a schematic view of an embodiment of the invention. The apparatus 117 comprises a piezoelectric component 125 which is a multilayer piezoelectric cantilever comprising a first part 122 and a second part 121. The first part 122 is an energy harvesting part for converting vibrational energy to electrical energy. The second part 121 is an oscillation feedback part for converting electrical energy back to vibrational energy so as to provide continuous power delivery as will be described in detail below.

In the embodiment of the invention shown in FIG. 1 the apparatus also incorporates an AC-DC converter 115 for converting an alternating current generated by the first part 122 of the piezoelectric component 125 into direct current. The apparatus further includes an output for sending a first portion of the direct current provided by the AC-DC converter 115 to an electronic device 130 and a feedback loop for sending a second portion of the direct current provided by the AC-DC converter to the second part 121 of the piezoelectric component. The feedback loop may comprise an oscillator 114. Preferably the apparatus also includes electrodes 100 and 102 interfaced to the surface of the first part 122 of the piezoelectric component and electrodes 104 and 106 interfaced to the second part of the piezoelectric component 121. An insulation layer 103 is disposed between the electrodes 102 and 104 for providing electrical insulation between the electrodes while maintaining intimate mechanical coupling between the electrodes. A further packaging insulation layer 107 may also be provided, and may be between an interface 108 of a support structure 109 and the bottom electrode 106 of the second part 105 of the piezoelectric component 125 as is shown in FIG. 1.

The first part 122 of the piezoelectric component 125 comprises a multilayer portion 101 made of at least one type of piezoelectric materials, which is configured to harvest mechanical energy, including energy in the form of environmental vibrations. These environmental vibrations may come from a variety of sources such as human motion, low frequency seismic vibrations, acoustic noise and vibrations caused by radio frequency propagations. This vibrational energy is converted by the piezoelectric multilayer portion 101 into electrical energy as a result of the piezoelectric effect of the piezoelectric material in the multilayer portion 101; the environmental vibrations cause the piezoelectric multilayer portion 101 to oscillate which generates mechanical stress inside the multilayer portion 101 and due to the properties of the piezoelectric material, this in turn causes electrical charges to accumulate in the material.

The first part 122 of the piezoelectric component 125 may further comprise electrodes 100, 102 on its upper and lower surfaces for charge collection. The multilayer portion 101 may also have electrodes embedded inside for guiding any charges generated in the multilayer portion 101 to the electrodes 100, 102 on its upper and lower surfaces. Mechanical stress in one direction, e.g. in a downward or an upward direction, will cause positive charges to accumulated on one of the electrodes 100, 102 and negative charges on the other electrode. Reversing the direction of the mechanical stress will cause reversal of charge accumulation, namely positive and negative charges now accumulated on opposite electrodes 102, 100. Therefore, repetitive reversal of mechanical stress directions in a vibration will cause an alternating voltage or a voltage exhibiting similar properties to be generated across the first part 122 of the piezoelectric component. The shape of the voltage signal generated depends on a number of factors, including the properties of the piezoelectric material used, i.e. in terms of elasticity, piezoelectric coefficients and dielectric constant, as well as the geometry and the arrangement of the piezoelectric component itself.

The majority of vibration sources with strong amplitudes which are suitable for harvesting are within the range of 4 Hz and 300 Hz. Piezoelectric materials suitable for converting vibrational energy to electric energy include, but are not limited to, gallium nitride (GaN), lead zirconate titanate (PZT), zirconate oxide (ZnO), aluminium nitride (AlN), polyvinylidene fluoride (PVDF), quartz, poly (vinylidene-fluoride-co-trifluoroethylene)(P(VDF-TrFE)) and any other nano and multi composite based piezoelectric materials.

Electrodes 100 and 102 are electrically connected to an AC-DC convertor 115. The alternating voltage generated across the energy harvesting part 122 of the piezoelectric component 125 is fed to the AC-DC converter 115 which is configured to convert the AC voltage into a DC voltage. In this example, the AC-DC converter comprises a rectifier and a peak detector configured to convert the alternating current into direct current. However, other types of AC-DC converter may also be suitable for use with the embodiments of this invention. An output is configured to direct a first portion of the converted DC current to an electronic device 130, the operation of which is then powered by the DC current.

This embodiment of this invention thus provides a system comprising the apparatus described above and an electronic device powered by the apparatus. The electronic device may be a sensor (e.g. a $TiO_2$/GF based gas sensor), a transmitter, a receiver, a light, a speaker, an electric circuit or any electronic device suitable for using the DC current generated for operation.

Embodiments of this invention thereby provide a self-contained, autonomous self-powered system for powering an electronic device by harvesting energy from the environment. This is particularly useful for high data rate wireless sensing and monitoring systems used in remote or hard to reach places which require battery free operation, for example implantable medical devices and environmental sensors. It is also envisioned that the apparatus and system has potential applications including in toys, telecommunications and transportation systems as well as enabling better micro scale integration of wireless applications.

A second portion of the current generated by the AC-DC converter 115 is directed to the second part 121 of the piezoelectric component 125 via a feedback loop.

In this embodiment of the invention the feedback loop comprises an oscillator 114. The oscillator is configured to receive a second portion of the direct current and/or the DC voltage from the AC-DC converter 115, to use the received direct current to generate an alternating current and to send the generated alternating current to the second part 121 of the piezoelectric component 125. The oscillator may be an RC oscillator (for example a Wien bridge oscillator) comprising a network of resistors and capacitors or an LC oscillator (for example a Colpitts oscillator) comprising a network of inductors and capacitors or any other oscillator that is suitable to generate an alternating current when biased and/or powered by a direct current.

Piezoelectric materials 105 in the second part 121 of the piezoelectric component 125 are configured to convert electrical energy into vibrational energy as a result of the reverse piezoelectric effect. AC current generated by the oscillator is applied to the second part of the piezoelectric component which induces vibrations of the second part 121 as a result of the reverse piezoelectric effect. As the second part 121 is mechanically coupled to the first part 122, the vibration of the second part then causes the first part 122 to vibrate further and to convert any further vibrational energy to electrical energy. As before, the generated AC voltage is converted to a DC voltage by the AC-DC convertor 115, a first part of the further generated electricity is output to the electronic device 130 and a second part of the further generated electricity is fed back to the second part 121 of the piezoelectric component 125 via the oscillator 114. This process repeats until the scale of vibration of the piezoelectric component 125 is below a level that is sufficient to sustain power generation. This effectively allows at least a part of the energy harvested by the first part 122 to be recycled via the feedback loop back to the first part 122. This energy recycling via the feedback loop makes the vibration of the first part 122 last much longer than it would do without the feedback loop, and the electronic device can be continuously powered for a period of time after an initial vibration triggered by an impulsive force. This provides a more sustainable power supply.

Preferably, the oscillator 114 is configured to generate alternating current at an identical or a similar frequency to the effective mechanical resonant frequency of the piezoelectric component. The effective mechanical resonant frequency is the resonant frequency of the whole of the multilayer piezoelectric cantilever 125. The mechanical oscillation frequency of a cantilever depends on cantilever dimensions, material thicknesses and also other parameters. Preferably, the oscillator is a voltage controlled oscillator (VCO) for fine tuning an output frequency of the oscillator. The modulation of the input voltage to the VCO modulates the output frequency up or down. By providing a voltage at the resonance frequency of the piezoelectric component, the vibration of the piezoelectric component is maximized.

To coarse tune the resonant frequency and to enable wider frequency range matching, the output signal of the oscillator may be processed by a frequency down converter (not shown in the figure) to enable the frequency of the oscillator output to match a relatively lower effective mechanical resonant frequency of the piezoelectric component. Alternatively, a tuning circuit can dynamically optimize signal feed 116, 119 into the VCO 114 to generate the highest matching quality factor output 110, 111 of the harvester, This circuit monitors the quality factor of the harvester output and then provides dynamic optimization of the AC-DC converter feed 116, 119 into the VCO to continuously home into the highest matching quality factor.

Preferably the oscillator 114 is also configured to send alternating current which oscillates in the same phase as the piezoelectric component oscillations when vibrating at the resonant frequency. By synchronising the oscillations in this way the oscillations in the first part of the piezoelectric component are further enhanced as the peaks and troughs coincide with those in the second part of the piezoelectric component. By being in phase the amplitude of the oscillations in the two parts of the piezoelectric component are additive rather than having the effect of cancelling each other out either in whole or part. This in turn causes more and steadier current to be generated in the first part of the piezoelectric component.

The first and the second parts of the piezoelectric component 125 may be separate pieces of piezoelectric materials. They may be made of the same or different types of piezoelectric material.

Figure 2:
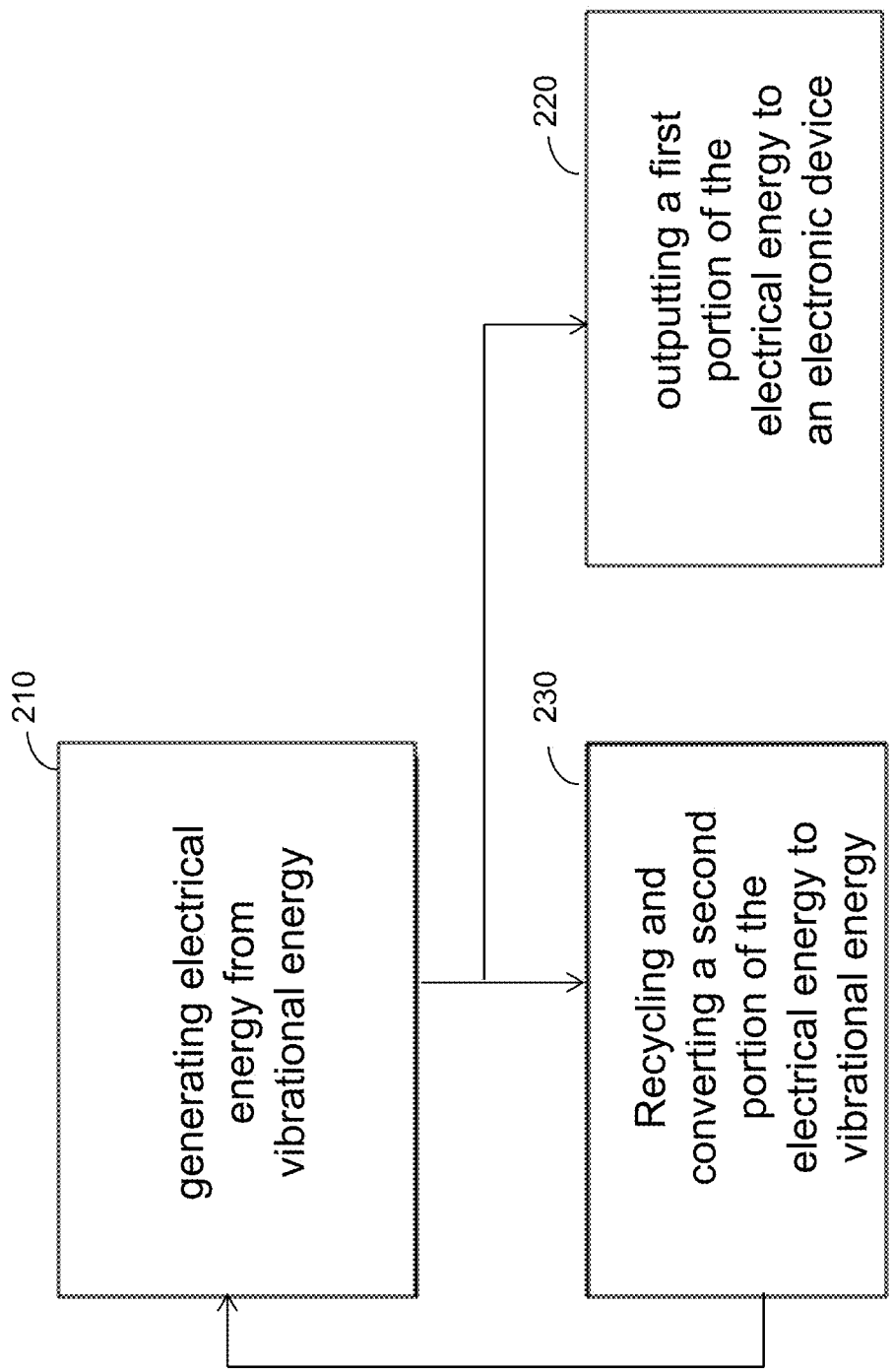
FIG. 2 shows a flow chart for a method according to the first embodiment of the invention.

FIG. 2 illustrates a method according to one embodiment of the present invention. In step 210, vibrational energy is converted into electrical energy. Preferably, the energy conversion is performed by a piezoelectric material as set forth above. Subsequent steps 220 and 230 are performed in parallel. In step 220, a first portion of the generated electrical energy is output to power the operation of an electronic device. In the meantime, in step 230, a second portion of the electrical energy is recycled and converted back to vibrational energy. The recycled energy in the form of vibrations is then going through the operation of the first step 210, namely being converted to electrical energy. Then the next cycle begins, in which the operations are similar to those in the previous cycle, i.e. a first portion of the electrical energy generated in the first step is output to power the electronic device according to step 220 and a second portion of the electrical energy is recycled according to step 230. The recycled energy may again go through the first step 210 and start a subsequent cycle. Thus, the initial energy is gradually consumed by the electronic device over a period of time and a part of the energy is recycled to allow more sustained energy supply to the electronic device. When the piezoelectric material stops to receive any further external mechanical energy, any energy left and being recycled in the system will be eventually consumed by the electronic device and dissipated due to losses caused by the wiring and connections in the apparatus.

Preferably, the electrical energy generated in step 210 has an alternating voltage or a voltage exhibiting similar characters. Preferably, the alternating voltage is converted to a direct voltage (DC voltage) by an AC-DC converter before being used to power the electronic device. Preferably, an oscillator is used to generate an alternating voltage based on the second part of the current provided by the AC-DC convertor. Preferably, the frequency of the alternating voltage is identical to very close to the effective resonance frequency of the piezoelectric material.

Figure 3:
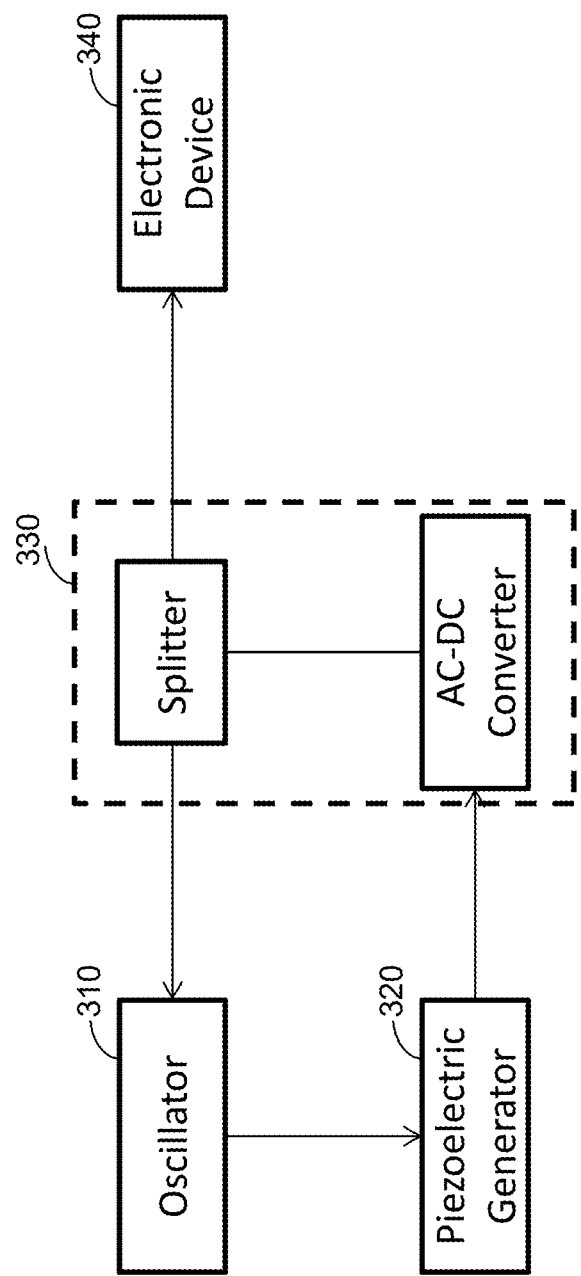
FIG. 3 shows a simplified representation of the first embodiment of the invention.
Figure 4:
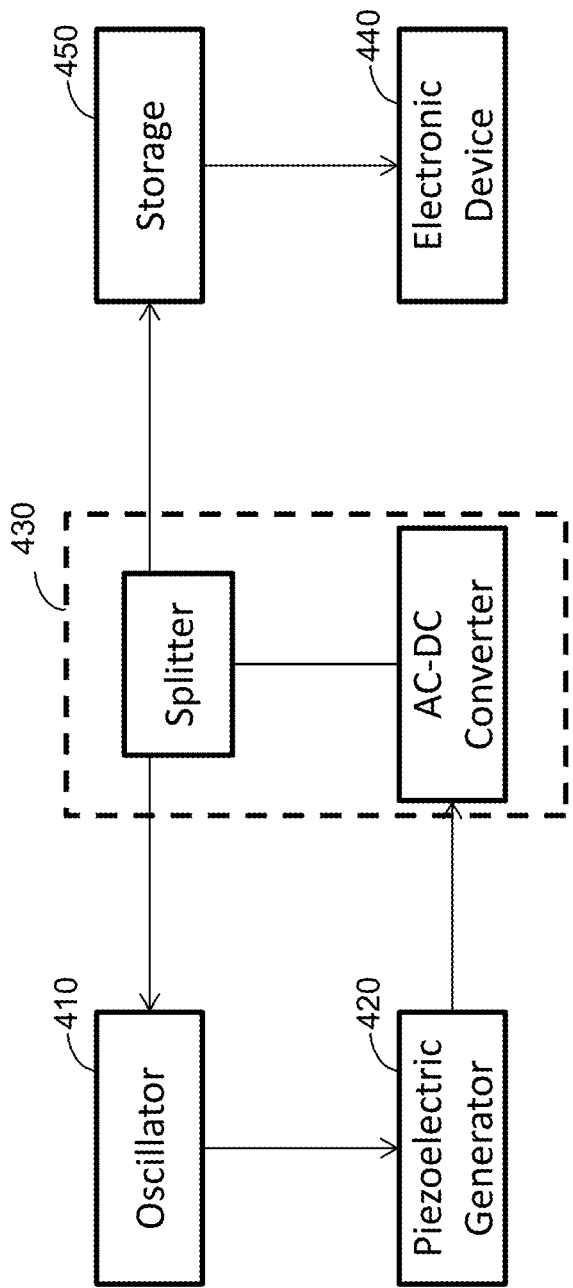
FIG. 4 shows a schematic view of a second embodiment of the invention.

FIG. 3 shows a simplified representation of the first embodiment of the present invention. Piezoelectric generator 320, oscillator 310, AC-DC converter 330 and electronic device 340 in FIG. 3 correspond to the piezoelectric component 125, the oscillator 114, the AC-DC converter 115 and the electronic device 130 in FIG. 1 respectively. The operation of these has been described above in detail in relation to FIG. 1. A signal splitter is embedded in the AC-DC converter 330, and the purpose of this is to regulate the current going into the oscillator to provide the desired output consistently. Preferably, an electronic circuitry (not illustrated) comprises the AC-DC converter 115, and also comprises a voltage regulator (not illustrated) for conditioning and regulating the output of the piezoelectric generator FIG. 4 illustrates a second embodiment of the present invention. Piezoelectric generator 420, oscillator 410, AC-DC converter 430 and electronic device 440 in the second embodiment are substantially the same as those in the first embodiment. The second embodiment additionally comprises an energy storage unit 450, which is capable of storing electrical energy. The energy storage unit 450 is configured to temporarily store a portion of the electrical energy generated by the piezoelectric generator 420 before gradually providing the portion of the electrical energy to the electronic device 440 over a period of time. The energy storage unit 450 may provide the energy to the electronic device 440 via an electronic circuitry. The energy storage unit 450 may be an electrochemical cell or a supercapacitor. A person of ordinary skill in the art would be able to deduce the rest of the operation of the second embodiment from the operation of the first embodiment described above.

Figure 5:
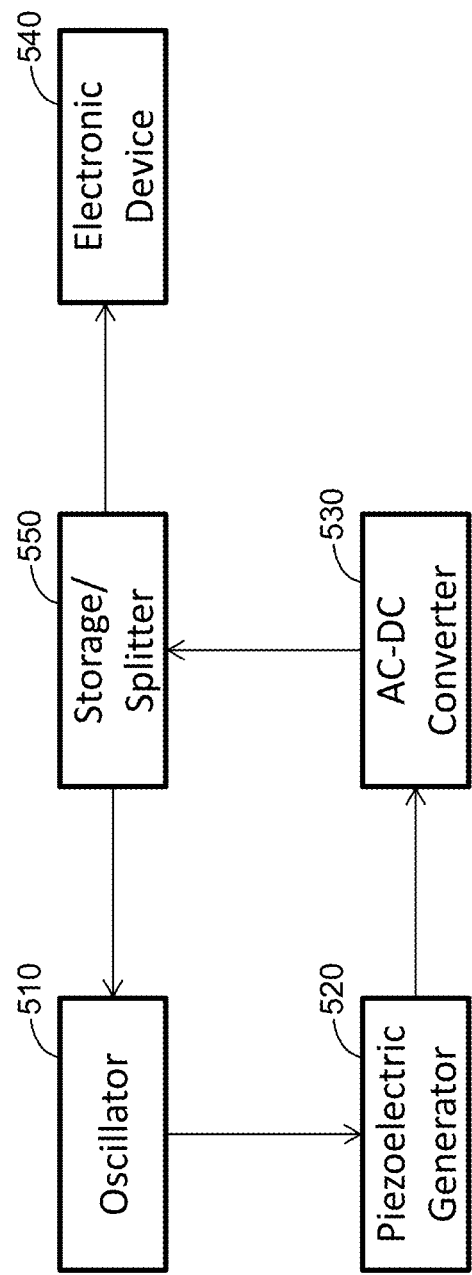
FIG. 5 shows a schematic view of a third embodiment of the invention.

FIG. 5 illustrates a third embodiment of the present invention. Piezoelectric generator 520, oscillator 510, AC-DC converter 530 and electronic device 540 in third embodiment are substantially the same as those in the second embodiment. However, in the third embodiment, the energy storage unit/splitter 550 is used for temporarily storing substantially all the electrical energy generated by the piezoelectric generator 520 and for providing a first portion of the stored electrical energy to the electronic device 540 and a second portion of the stored electrical energy to the oscillator 510. The storage unit and the splitter may be provided in a single component or separate components. As in the first and the second embodiments, the oscillator 510 recycles the energy so the apparatus provides sustainable power over a longer period of time. A person of ordinary skill in the art would be able to deduce the rest of the operation of the third embodiment with reference to the first or the second embodiment.

Various units in the second and the third embodiment may be provided on the same substrate. One side of the substrate may accommodate the piezoelectric generator 520, the oscillator 510 and the AC-DC converter 530, and the other side of the substrate may accommodate the energy storage unit, an electronic circuitry for conditioning and regulating the output of the piezoelectric generator 520 and an electronic circuitry through which the energy storage unit 550 powers the electronic device 540. The separation of the energy storage unit 550 and the piezoelectric generator 520 on different sides of the substrate helps increasing compactness of the device. Interface layers may be deposited at both sides of the substrate for interfacing between the various units on both sides.

If the electronic device 340, 440 and 540 is a $TiO_2$ sensor, a graphene layer may be patterned above a $TiO_2$ film of the sensor to increase a sensitivity of the sensing mechanism.

The present invention is not to be limited in scope by the specific aspects and embodiments described herein. Indeed, various modifications of the invention in addition to those described herein will become apparent to those skilled in the art from the foregoing description and accompanying figures. Such modifications are intended to fall within the scope of the appended claims. Moreover, all aspects and embodiments described herein are considered to be broadly applicable and combinable with any and all other consistent aspects and embodiments, as appropriate.

The invention claimed is:

1. An apparatus for energy conversion, the apparatus comprising:
    a piezoelectric component comprising a first part configured to convert vibrational energy into electrical energy and to generate an AC voltage;
    an AC-DC converter configured to convert the generated AC voltage to a DC voltage;
    an output for sending a first portion of a generated current from the AC-DC converter to an electronic device; and
    a feedback loop for feeding a second portion of the generated current to a second part of the piezoelectric component, the feedback loop comprising an oscillator configured to receive the second portion of the generated current, to generate an alternating voltage at an identical frequency to an effective resonant frequency of the piezoelectric component and to apply the generated alternating voltage to the second part of the piezoelectric component,
    wherein the second part of the piezoelectric component is coupled to the first part of the piezoelectric component and is configured to convert the second portion of the electrical energy into vibrational energy thereby causing the first part of the piezoelectric component to vibrate.

2. The apparatus according to claim 1, wherein the generated current is a direct current and the second portion of the generated current is used by the oscillator.

3. The apparatus according to claim 1, wherein the oscillator is a voltage controlled oscillator.

4. The apparatus according to claim 3, further comprising a frequency down converter for down-converting the frequency of an output of the oscillator so that it matches the effective resonant frequency of the piezoelectric component.

5. An apparatus for energy conversion, the apparatus comprising:
    a piezoelectric component comprising a first part configured to convert vibrational energy into electrical energy;
    an output for sending a first portion of the electrical energy to an electronic device; and
    a feedback loop for feeding a second portion of the electrical energy to a second part of the piezoelectric component,
    wherein the second part of the piezoelectric component is coupled to the first part of the piezoelectric component and is configured to convert the second portion of the electrical energy into vibrational energy thereby causing the first part of the piezoelectric component to vibrate, and wherein surfaces of the first part of the piezoelectric component are interfaced by electrodes for collecting charges from the first part of the piezoelectric component and surfaces of the second part of the piezoelectric component are interfaced by electrodes for imparting charges into the piezoelectric component.

6. An apparatus for energy conversion, the apparatus comprising:
    a piezoelectric component comprising a first part configured to convert vibrational energy into electrical energy;
    an output for sending a first portion of the electrical energy to an electronic device; and
    a feedback loop for feeding a second portion of the electrical energy to a second part of the piezoelectric component,
    wherein the second part of the piezoelectric component is coupled to the first part of the piezoelectric component and is configured to convert the second portion of the electrical energy into vibrational energy thereby causing the first part of the piezoelectric component to vibrate and wherein the first part of the piezoelectric component is separated from the second part of the piezoelectric component by an insulating layer.

7. The apparatus according to claim 6, wherein the piezoelectric component is a multilayer piezoelectric cantilever.

8. The apparatus according to claim 6, further comprising an energy storage unit for temporarily storing at least a portion of the electrical energy generated by the piezoelectric component before providing the portion of the electrical energy to the electronic device.

9. The apparatus according to claim 6, wherein the electronic device is one of: a sensor, a transmitter, a receiver, a light, a speaker or an electric circuit.

10. A method for energy conversion, the method comprising:
    converting vibrational energy using a first part of a piezoelectric component into electrical energy;
    converting an alternating voltage generated by the first part of the piezoelectric component by an AC-DC converter into a DC voltage;
    outputting a first portion of a generated current from the AC-DC converter to an electronic device;
    feeding a second portion of the generated current towards a second part of the piezoelectric component via a feedback loop,
    using an oscillator in the feedback loop to generate an alternating voltage at an identical frequency to an effective resonant frequency of the piezoelectric component; and
    converting, by the second part of the piezoelectric component, the second portion of the electrical energy into vibrational energy thereby causing the first part of the piezoelectric component coupled to the second part of the piezoelectric component to vibrate.

11. The method according to claim 10, wherein the generated current is a direct current and wherein the method further comprises the oscillator using the second portion of the generated current.

12. A method for energy conversion, the method comprising:
    converting vibrational energy using a first part of a piezoelectric component into electrical energy;
    outputting a first portion of the electrical energy to an electronic device;

feeding a second portion of the electrical energy towards a second part of the piezoelectric component via a feedback loop, converting, by the second part of the piezoelectric component, the second portion of the electrical energy into vibrational energy thereby causing the first part of the piezoelectric component coupled to the second part of the piezoelectric component to vibrate; and collecting charges from the first part of the piezoelectric component on electrodes interfaced onto surfaces of the piezoelectric component, and using electrodes to interface surfaces of the second part of the piezoelectric component.

13. A method for energy conversion, the method comprising:

converting vibrational energy using a first part of a piezoelectric component into electrical energy;

outputting a first portion of the electrical energy to an electronic device;

feeding a second portion of the electrical energy towards a second part of the piezoelectric component via a feedback loop, converting, by the second part of the piezoelectric component, the second portion of the electrical energy into vibrational energy thereby causing the first part of the piezoelectric component coupled to the second part of the piezoelectric component to vibrate; and using an insulating layer to separate the first part of the piezoelectric component from the second part of the piezoelectric component.

14. The method according to claim 13, further comprising powering the electronic device using the first portion of the electrical energy, wherein the electronic device is one of: a sensor, a transmitter, a receiver, a light, a speaker or an electric circuit.

* * * * *